United States Patent
Toub et al.

(10) Patent No.: US 8,392,922 B2
(45) Date of Patent: Mar. 5, 2013

(54) MARSHALING RESULTS OF NESTED TASKS

(75) Inventors: Stephen H. Toub, Seattle, WA (US);
Joseph E. Hoag, Bothell, WA (US);
John J. Duffy, Seattle, WA (US); Danny S. Shih, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 394 days.

(21) Appl. No.: 12/719,700

(22) Filed: Mar. 8, 2010

(65) Prior Publication Data
US 2011/0219380 A1 Sep. 8, 2011

(51) Int. Cl.
*G06F 9/46* (2006.01)

(52) U.S. Cl. .......................... 718/101; 718/102; 718/103

(58) Field of Classification Search .................. None
See application file for complete search history.

(56) References Cited

U.S. PATENT DOCUMENTS

| | | | |
|---|---|---|---|
| 6,701,311 B2 * | 3/2004 | Biebesheimer et al. | 1/1 |
| 7,159,217 B2 * | 1/2007 | Pulsipher et al. | 718/100 |
| 2004/0015834 A1 | 1/2004 | Mestre | |
| 2008/0275742 A1 | 11/2008 | Vermette | |
| 2009/0228543 A1 | 9/2009 | Collum | |

FOREIGN PATENT DOCUMENTS

WO WO 2009041801 * 4/2009

OTHER PUBLICATIONS

Albahari, Joe, "AggregateException with a simple Future . . . why?", Parallel Computing, Apr. 20, 2009, 8 pages, found at /social.msdn.microsoft.com/Forums/en-US/parallelextensions/thread/3786be5a-0381-4a18-b8e5-c66f5a8c3bf7.
Whetstone, James, "How to marshal complex data structures", Feb. 4, 2007, 28 pages, found at eggheadcafe.com/software/aspnet/29183161/how-to-marshal-complex-da.aspx.
Grabmuller, Martin, Monad Transformers Step by Step, Oct. 16, 2006, 13 pages.
Erwig, Martin, "Monadification of Functional Programs", School of EECS, Oregon State University, Corvallis, OR, Feb. 27, 2004, 34 pages.
Fischer, Sebastian, et al., "Reinventing Haskell Backtracking", Christina-Albrechts University of Kiel, Germany, Based on information and belief available, at least as early as Nov. 24, 2009, 14 pages.

* cited by examiner

*Primary Examiner* — Camquy Truong
(74) *Attorney, Agent, or Firm* — Workman Nydegger (57) ABSTRACT

The present invention extends to methods, systems, and computer program products for marshaling results of nested tasks. Unwrap methods are used to reduce the level of task nesting and insure that appropriate results are marshaled between tasks. A proxy task is used to represent the aggregate asynchronous operation of a wrapping task and a wrapped task. The proxy task has a completion state that is at least indicative of the completion state of the aggregate asynchronous operation. The completion state of the aggregate asynchronous operation is determined and set from one or more of the completion state of the wrapping task and the wrapped task. The completion state of the proxy task can be conveyed to calling logic to indicate the completion state of the aggregate asynchronous operation to the calling logic.

20 Claims, 4 Drawing Sheets

MARSHALING RESULTS OF NESTED TASKS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In some computing environments, a task is more specifically defined as a work item that represents an operation an application is to perform. Many tasks are configured to return a value of a particular type (e.g., integer, string, etc.) to pass information back to an application that performed the task. For example, Task<TResult> is a task whose operation returns a value of type TResult. It is also not uncommon for tasks to be nested within one another. When tasks are nested, the return value type for a task (the outer task) may be another task (the inner task). For example, Task<Task> is task whose operation returns a value of type Task. A nested task can also be configured to return a further value. For example, Task<Task<TResult>> is task whose operation returns a value of type Task<TResult> (which is, in turn, configured to return a value of type TResult).

A variety of different computing scenarios can produce nested tasks. Unfortunately, nested tasks can lead to unexpected application behaviors (e.g., bugs) that are easily overlooked and/or difficult to correct.

For example, when an (outer) task is called, the (outer) task can call a further (inner) task to create desired results for the task. However, if the further (inner) task is to take some time to complete, in may be desirable to have the further (inner) task complete asynchronously so that the (outer) task does not block waiting for a result.

For example, consider an outer task that returns an integer count of the number of friends on a person's friends list. The outer task can be of the form Task<int>. Within the outer task can be an asynchronous call to a network database that stores the friends list. Since the call to the network database is asynchronous, the outer task does not block and its thread is released. However, the outer task must still return a value, even though it completes before the network database call and thus does not have the count of the number of friends. Thus, the outer task returns an inner task that represents the completion of the database call, which is also of the form Task<int>. As such, the outer task is essentially represented as a Task<Task<int>>. Accordingly, accessing the outer task's results returns the inner task (i.e., Task<int>), which is a reference to the item that is going to return the count of the number of friends.

As the number of asynchronous tasks increases, so does the potential for unexpected application behavior. For example, an API can include functionality for asynchronously logging into a Web service (e.g., a social networking site), retrieving a list of friends, and sending an electronic mail to each friend. A LogOn method takes a username and password, and it returns a Task<TResult> that represents the log on operation. When the log on operation is complete, the Task's Result will be a UserToken. For example:

public Task<UserToken> LogOn(string username, string password);

A GetFriendsList method takes a UserToken, and it returns a Task<TResult> that represents the friend list retrieval operation. When the friend list retrieval operation is complete, the Task's Result will be a FriendCollection. For example:

public Task<FriendCollection> GetFriendList(UserToken userToken);

A SendMail method takes a Friend, and it returns a Task that represents the email sending operation. For example:

public Task SendEmail(Friend friend, string subject, string body);

A user may desire to write code utilizing these APIs and task continuations, which are used to schedule a task when the original has completed. For example:

```
1. var userToken = LogOn(user, pass);
2. var friends = userToken.ContinueWith(_ =>
     GetFriendList(userToken.Result));
3. var emails = friends.ContinueWith(_ =>
4. {
5.    var sentMails = new List<Task>( );
6.    foreach(var friend in friends.Result)
7.    {
8.       sentMails.Add(SendEmail(friend, subject, body));
9.    }
10.   return Task.Factory.ContinueWhenAll(
11.      sentMails.ToArray( ), tasks => Task.WaitAll(tasks));
12. });
13. emails.ContinueWith(_ => Console.WriteLine("All emails sent"));
```

Although a ".ContinueWith" is included at line 2, this indicates that the code is to continue when the outer task completes. Thus, when the LogOn operation has asynchronously completed, the call to GetFriendList in line 2 will be invoked to asynchronously retrieve the friends list. This call will return a Task<FriendCollection> to represent the result of the asynchronous operation. Because the code in the delegate passed to ContinueWith at line 2 returns a Task<FriendCollection>, the 'friends' variable is Task<Task<FriendCollection>>. The friends' variable being Task<Task<FriendCollection>> causes a compiler error at the foreach loop, because 'friends.Result' returns a Task<FriendCollection> instead of a FriendCollection. Other similar problems occur at other lines in the code sample.

These and other similar types of compiler errors can often be solved by avoiding type inference (i.e., not using the 'var' keyword). However, even when a developer realizes the type mismatch, additional logic must still be coded to unwrap the 'friends' Task so that it returns an actual FriendCollection. Coding such logic is nontrivial and can be relatively difficult if the logic is to account for exceptions, cancellation, etc.

BRIEF SUMMARY

The present invention extends to methods, systems, and computer program products for marshaling results of nested tasks. For example, embodiments of the invention facilitate marshaling the state of one task to another task. A call to a wrapping task is received from calling logic. The wrapping task has a result that is represented by a wrapped task wrapped within the wrapping task.

A proxy task that represents the aggregate asynchronous operation of the wrapping task and the wrapped task is created. The proxy task has a completion state that is at least indicative of the completion state of the aggregate asynchronous operation. The proxy task is returned to the calling logic without requiring the calling logic to wait for completion of either the wrapping task or the wrapped task.

The completion state of the aggregate asynchronous operation is determined. Determining the completion state of the aggregate asynchronous operation includes determining the completion state of the wrapping task. When the completion state of the wrapping task indicates that the wrapping task ran to completion, determining the completion state of the aggregate asynchronous operation also includes determining the completion state of the wrapped task.

The completion state of the proxy task is set to the completion state of the wrapped task when the completion state of the wrapping task indicates that the wrapping task ran to completion. Alternately, completion state of proxy task is set to the completion state of the wrapping task when the completion state of the wrapping task indicates that the wrapping task did not run to completion. Upon completion of the aggregate asynchronous operation, the completion state of the proxy task is conveyed to the calling logic to at least indicate the completion state of the aggregate asynchronous operation to the calling logic.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for marshaling results of nested tasks. For example, embodiments of the invention facilitate marshaling the state of one task to another task. A call to a wrapping task is received from calling logic. The wrapping task has a result that is represented by a wrapped task wrapped within the wrapping task.

A proxy task that represents the aggregate asynchronous operation of the wrapping task and the wrapped task is created. The proxy task has a completion state that is at least indicative of the completion state of the aggregate asynchronous operation. In general, a completion state for a task, including any of the wrapping task, wrapped task, and proxy task, can be one of: ran to completion with results data, faulted with exception data, or was canceled. However, other completion states are also possible. The proxy task is returned to the calling logic without requiring the calling logic to wait for completion of either the wrapping task or the wrapped task.

The completion state of the aggregate asynchronous operation is determined. Determining the completion state of the aggregate asynchronous operation includes determining the completion state of the wrapping task. When the completion state of the wrapping task indicates that the wrapping task ran to completion, determining the completion state of the aggregate asynchronous operation also includes determining the completion state of the wrapped task.

The completion state of the proxy task is set to the completion state of the wrapped task when the completion state of the wrapping task indicates that the wrapping task ran to completion. Alternately, completion state of proxy task is set to the completion state of the wrapping task when the completion state of the wrapping task indicates that the wrapping task did not run to completion. Upon completion of the aggregate asynchronous operation, the completion state of the proxy task is conveyed to the calling logic to at least indicate the completion state of the aggregate asynchronous operation to the calling logic.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1A:
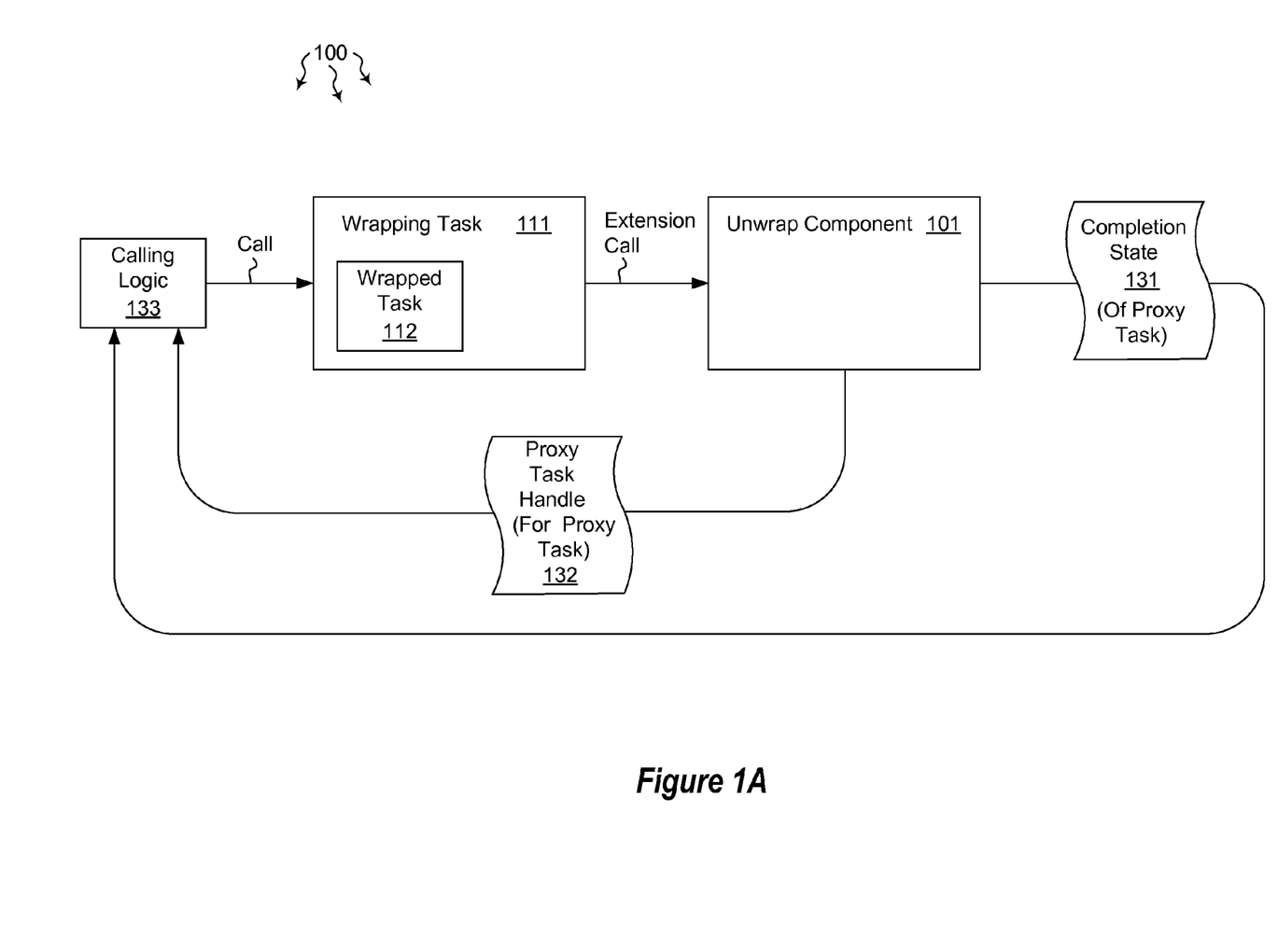
FIG. 1A illustrates an example computer architecture that facilitates marshaling the state of one task to another task.

FIG. 1A illustrates an example computer architecture 100 that facilitates marshaling the state of one task to another task. Referring to FIG. 1A, computer architecture 100 includes calling logic 133, wrapping task 111, and unwrap component 101. Wrapping task 111 further includes wrapped task 112. Each of the components depicted in computer architecture 100 can be connected to one another via a computer system bus. Accordingly, the components can communicate with one another over the computer system bus.

Alternately, one or more of the depicted components in computer architecture 100 can be connected to one another over (or be part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Figure 2:
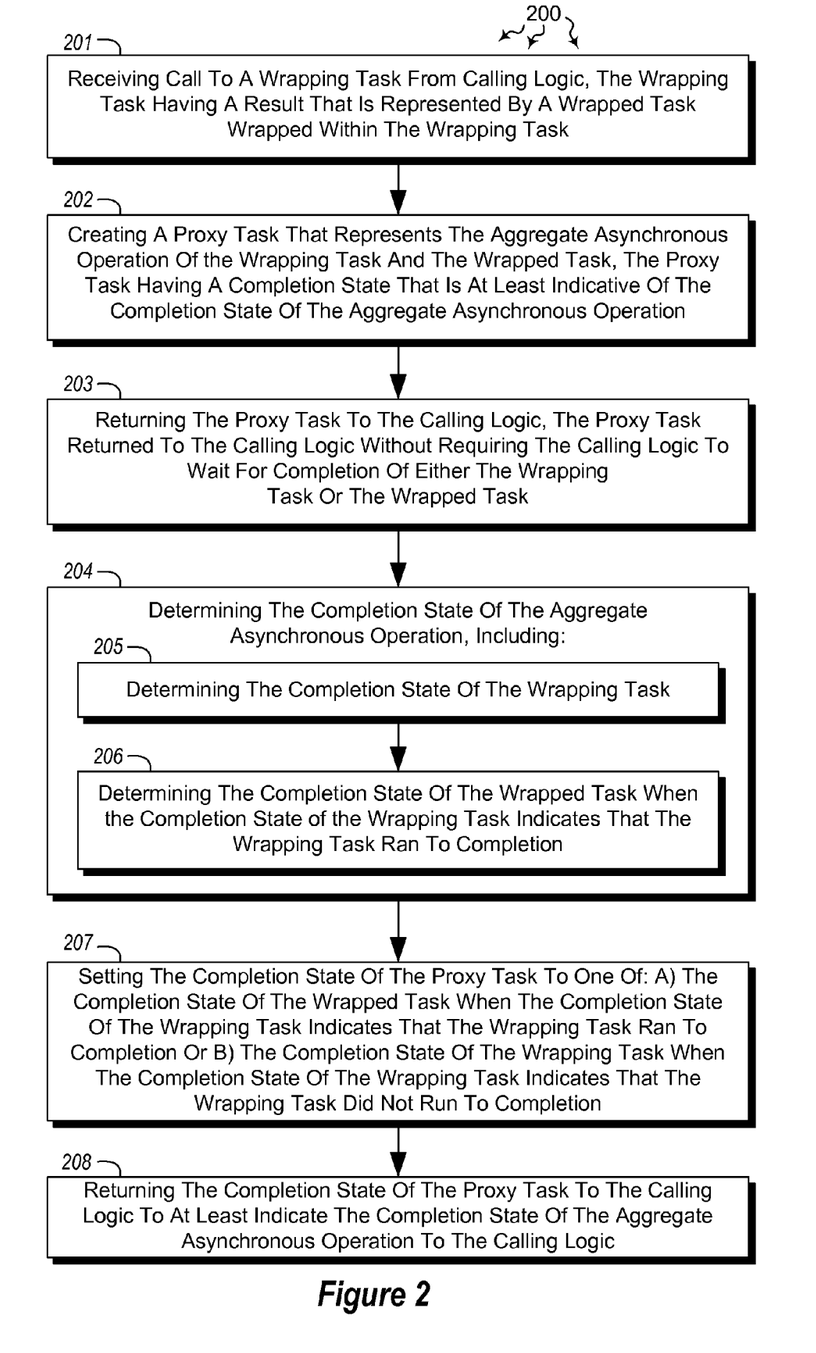
FIG. 2 illustrates a flow chart of an example method for marshaling the state of one task to another task.

FIG. 2 illustrates a flow chart of an example method 200 for marshaling the state of one task to another task. Method 200 will be described with respect to the components and data of computer architecture 100.

Method 200 includes an act of receiving call to a wrapping task from calling logic, the wrapping task having a result that is represented by a wrapped task wrapped within the wrapping task (act 201). For example, wrapping task 111 can receive a call from calling logic 133. The result of wrapping task 111 is represented by wrapped task 112. Calling logic 133 can be another program, executing code module, software component, etc, that desires results from the execution of wrapping task 111.

Method 200 includes an act of creating a proxy task that represents the aggregate asynchronous operation of the wrapping task and the wrapped task, the proxy task having a completion state that is at least indicative of the completion state of the aggregate asynchronous operation (act 202). For example, during execution wrapping task 111 can make extension call to unwrap component 101. Unwrap component 101 can create a proxy task that represents the aggregate asynchronous operation of the wrapping task 111 and the wrapped task 112. The proxy task has a completion state that is at least indicative of the completion state of the aggregate asynchronous operation representative of wrapping task 111 and the wrapped task 112.

Method 200 includes an act of returning the proxy task to the calling logic, the proxy task returned to the calling logic without requiring the calling logic to wait for completion of either the wrapping task or the wrapped task (act 203). For example, unwrap component 101 can return proxy task handle 132 to calling logic 133. Proxy task handle 132 can be returned to calling logic 133 without requiring calling logic 133 to wait for completion of wrapping task 111 or wrapped task 112.

Method 200 includes an act of determining the completion state of the aggregate asynchronous operation (act 204). For example, unwrap component 111 can determine the completion state of the aggregate asynchronous operation representative of wrapping task 111 and the wrapped task 112.

Figure 1B:
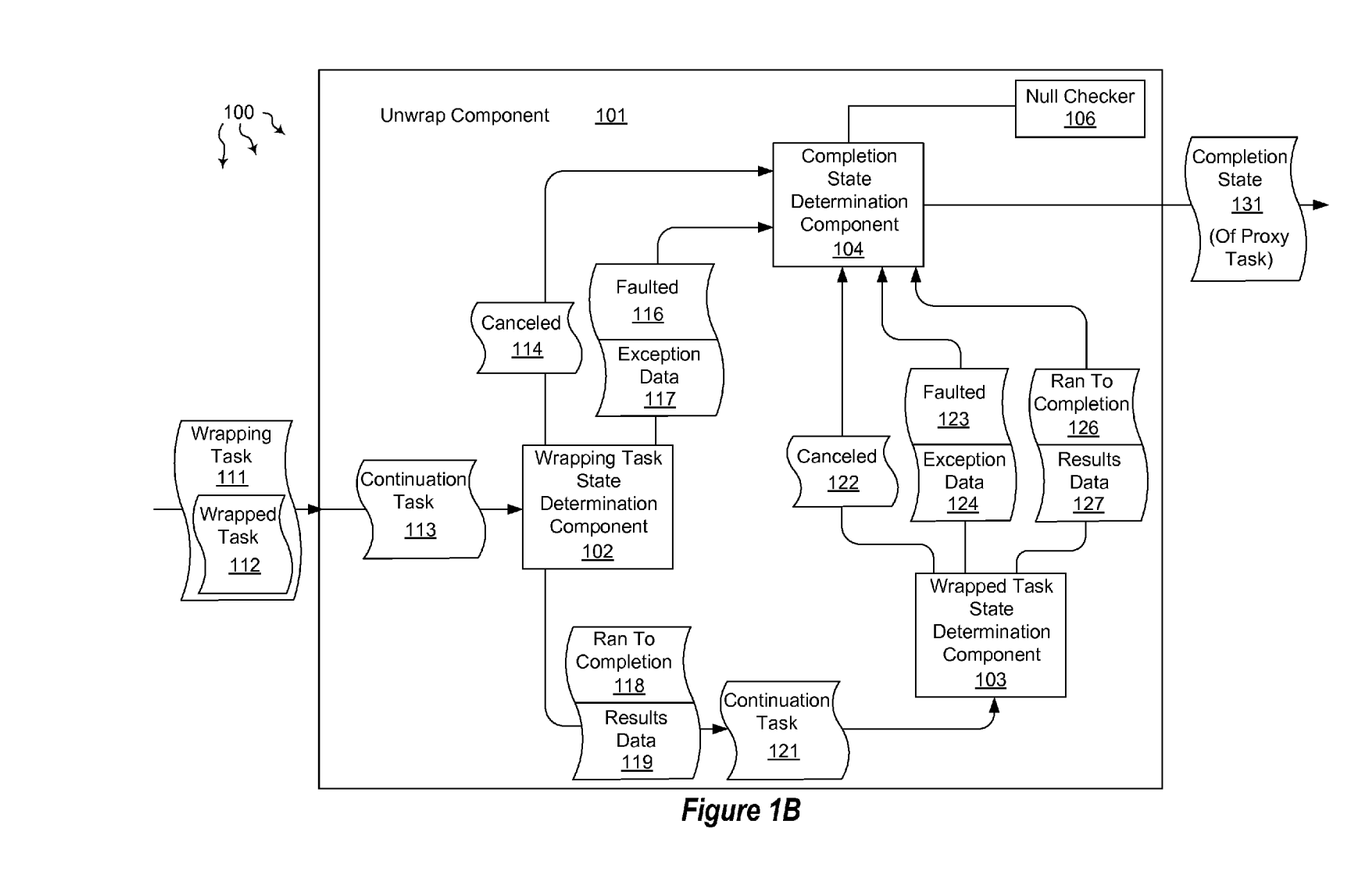
FIG. 1B illustrates a more detailed view of the unwrap component from FIG. 1A

FIG. 1B illustrates a more detailed view of the unwrap component 101. As depicted in FIG. 1B, unwrap component 101 includes wrapping task state determination component 102, wrapped task state determination component 103, completion state determination component 104, and null checker 106. When unwrap component 101 is called, a continuation task 113 is taken on wrapping task state determination component 102. Wrapping task state determination component 102 determines the completion state of the wrapping task. The completion state of a task can include a status and optional return data. For example, the completion state of task can be: ran to completion (the status), ran to completion (the status) and results data (the return data), faulted (the status) and exception data (the return data), or canceled (the status). Other completion states are also possible.

For example, it may be that a wrapping task is a Task<TResult> but has a result value of null. Thus, the body of the wrapping task did not return a Task as it was supposed to, but instead returned a null value. When this occurs, there are several options on how to proceed, such as faulting the proxy or canceling the proxy.

When the state of the wrapping task is canceled or faulted with exception data, wrapping task state determination component 102 passes the completion state of the wrapping task to completion state determination component 104. Upon receiving the completion state of the wrapping task, completion state determination component 104 sets the completion state of the proxy task to the completion state of the wrapping task. Thus, if the completion status of wrapping task is canceled or faulted with exception data, completion state determination component 104 correspondingly sets the completion status of the proxy task to canceled or faulted with exception data respectively.

On the other hand, if the state of the wrapping task ran to completion with results data, wrapping task state determination component 102 passes the completion state of the wrapping task to wrapped task state determination component 103. A continuation task 121 is taken on wrapped task state determination component 103 with the completion state of the wrapping task.

Wrapped task state determination component 103 determines the completion state of the wrapped task. Wrapped task state determination component 103 then passes the completion state of the wrapped task to completion state determination component 104. Upon receiving the completion state of the wrapped task, completion state determination component 104 correspondingly sets the completion status of the proxy task to completion status of the wrapped task.

Completion state determination component 104 then outputs the completion status of the proxy task to the calling logic.

Null checker 106 checks a wrapped task to determine if the wrapped task is null. Detection of a null wrapped task results in a status of canceled for the proxy task.

Thus, when the completion status of a wrapping task is canceled or faulted, the completion state of the proxy task is set to the completion state of the wrapping task. On the other hand, if the completion status of a wrapping task ran to completion, the completion state of the proxy task is set to the completion state of the wrapped task.

Accordingly, act 204 includes an act of determining the completion state of the wrapping task (act 205). For example, unwrap component 101 can receive wrapping task 111 containing wrapped task 112. Continuation task 113 is taken on wrapping task state determination component 102. Wrapping task state determination component 102 determines the completion state of wrapping task 111.

When the completion state of wrapping task 111 is canceled, wrapping task state determination component 102 can send the canceled state 114 to completion state determination component 104. Similarly, when the completion state of wrapping task 111 is faulted with exception data, wrapping task state determination component 102 can send the faulted state 116 and exception data 117 to completion state determination component 104. On the other hand, if the completion state of wrapping task 111 ran to completion with results data, wrapping task state determination component 102 can send the ran to completion state 118 and results data 119 to wrapped task state determination component 103. Thus, wrapping task state determination component 102 either sends the canceled or faulted states to completion state determination component 104 or sends the ran to completion state to wrapped task state determination component 103.

Act 204 includes an act of determining the completion state of the wrapped task when the completion state of the wrapping task indicates that the wrapping task ran to completion (act 206). For example, continuation task 121 is taken on wrapped task state determination component 103. Wrapping task state determination component 103 determines the completion state of wrapping task 111.

When the completion state of wrapped task 112 is canceled, wrapped task state determination component 103 can send canceled state 122 to completion state determination component 104. Similarly, when the completion state of wrapped task 112 is faulted with exception data, wrapped task state determination component 103 can send faulted state 123 and exception data 124 to completion state determination component 104. Likewise, if the completion state of wrapped task 112 ran to completion with results data, wrapped task state determination component 103 can send ran to completion state 126 and results data 127 to completion state determination component 104. Thus, when appropriate, wrapped task state determination component 103 sends one of the canceled, faulted, or ran to completion states to completion state determination component 103.

Method 200 includes an act of setting the completion state of the proxy task to one of: a) the completion state of the wrapped task when the completion state of the wrapping task indicates that the wrapping task ran to completion or b) the completion state of the wrapping task when the completion state of the wrapping task indicates that the wrapping task did not run to completion (act 207). For example, upon receiving a completion status of canceled, faulted, or ran to completion from wrapped task state determination component 103, completion state determination component 104 can set the completion state of the proxy to the completion state of wrapping task 111. On the other hand, upon receiving a completion status of canceled or faulted from wrapping task state determination component 102, completion state determination component 104 can set the completion state of the proxy to the completion state of wrapping task 111.

Generally, when the completion status of wrapping task 111 is canceled, faulted, or ran to completion with a result of null, wrapped task state determination component 103 is not utilized.

Method 200 includes an act of conveying the completion state of the proxy task to the calling logic to at least indicate the completion state of the aggregate asynchronous operation to the calling logic (act 208). For example, unwrapping component 101 can convey completion state 131 to calling logic 133. Completion state 131 indicates the completion state of the aggregate asynchronous operation representing wrapping task 111 and wrapped task 112.

Figure 3A:
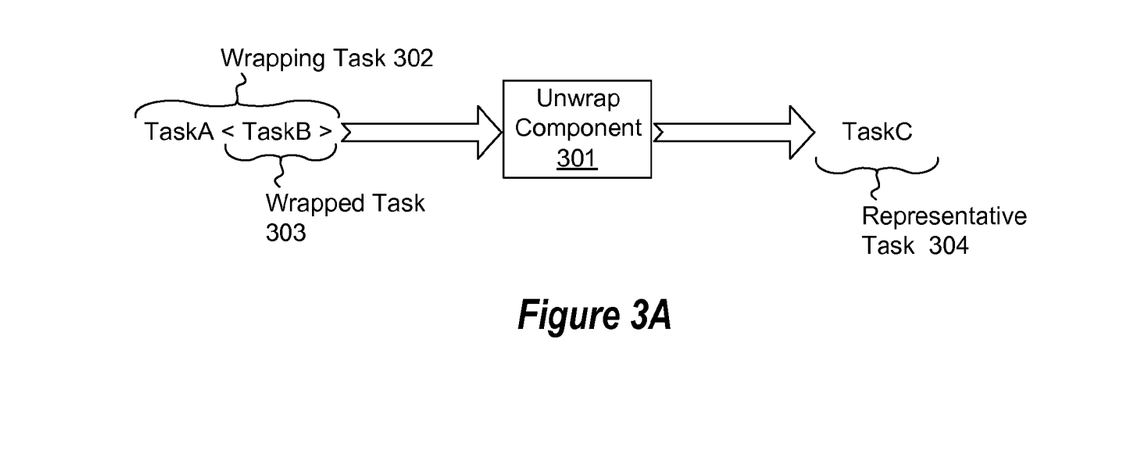
FIGS. 3A and 3B illustrate examples of unwrapping a task.

Some embodiments of the invention use an extension method to transform a Task<Task> into a Task that fully represents the original nested task, including exceptions, cancellation state, etc. For example, FIG. 3A depicts an example of transforming a Task<Task> into a Task. As depicted, wrapped task 303 is wrapped inside wrapping task 302. Wrapping task 302 and wrapped task 303 are input to unwrap component 301. Unwrap component 301 transforms wrapping task 302 and wrapped task 303 into representative task 304. Representative task 304 fully represents wrapped task 303.

Figure 3B:
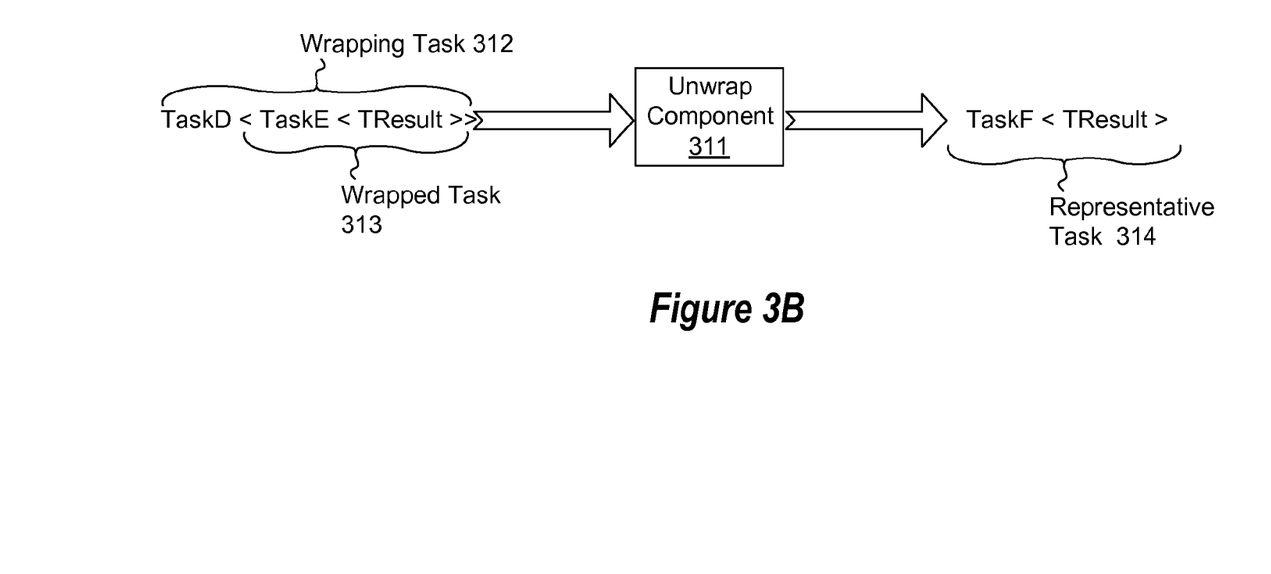

Similarly, other embodiments of the invention use an extension method to transform a Task<Task<TResult>> into a Task<TResult> that fully represents the original nested task, including exceptions, cancellation state, etc. For example, FIG. 3B depicts an example of transforming a Task<Task<TResult>> into a Task<TResult>. As depicted, wrapped task 313 is wrapped inside wrapping task 312. Wrapping task 312 and wrapped task 313 are input to unwrap component 311. Unwrap component 311 transforms wrapping task 312 and wrapped task 313 into representative task 314. Representative task 314 fully represents wrapped task 313.

Embodiments of the invention include using a TaskCompletionSource <TResult> object in conjunction with a continuation Task to marshal the completion state of one task to another. Thus, the completion state of a nested task can be flowed to a new non-nested task that can serve as a proxy for further computation.

Methods can be defined to implement embodiments of the invention. The methods can be defined in virtually any programming terminology and style, such as, for example, C++ templates, Java generics, etc. Using C# terminology and style, methods can be defined as follows:

```
public static Task Unwrap(this Task<Task> task);
public static Task<TResult> Unwrap<TResult>(this
     Task<Task<TResult>> task);
```

In some embodiments, extension methods are used instead of normal instance methods. Using extension methods helps ensure that the Unwrap is called by objects of the appropriate type (e.g., Task<Task> and Task<Task<TResult>> respectively).

The following pseudo code can be used to unwrap Task<Task<TResult>>. Code for unwrapping Task<Task> works in similar fashion.

```
public static Task<TResult> Unwrap<TResult>(this
Task<Task<TResult>> task)
{
  tcs = new TaskCompletionSource<TResult>( );
  task.ContinueWith(delegate
  {
    switch (task.Status)
    {
      case TaskStatus.RanToCompletion:
        if (task.Result != null)
        {
          task.Result.ContinueWith(delegate
          {
            tcs.SetFromTask<TResult>(task.Result);
          });
        }
        else tcs.SetCanceled( ):
          return;
      case TaskStatus.Canceled:
      case TaskStatus.Faulted:     tcs.SetFromTask<TResult>(task);
        return;
    }
  });
  return tcs.Task;
}
```

Within the pseudo code example, a TaskCompletionSource<TResult> is created, and its member Task is eventually returned from the method. The returned Task is set using continuation Task(s). First, a continuation is scheduled for the wrapping Task. If the wrapping Task is Canceled or Faulted, that state is marshaled to the returned Task, and the procedure is done. If it RanToCompletion, the wrapped Task is examined. If the wrapped Task is null, then the returned Task is canceled. Otherwise, a continuation is scheduled for the wrapped Task to marshal its final state (Canceled, Faulted+Exception Data, or RanToCompletion+Result) to the returned Task.

Using unwrap extension methods can reduce unexpected program behaviors. The following pseudo code example uses unwrap to help insure that correct results are marshaled between tasks.

```
1.   var userToken = LogOn(user, pass);
2.   var friends = userToken.ContinueWith(_ =>
       GetFriendList(userToken.Result)).Unwrap( );
3.   var emails = friends.ContinueWith(_ =>
4.   {
5.     var sentMails = new List<Task>( );
6.     foreach(var friend in friends.Result)
7.     {
8.       sentMails.Add(SendEmail(friend, subject, body));
9.     }
10.    return Task.Factory.ContinueWhenAll(
11.      sentMails.ToArray( ), tasks => Task.WaitAll(tasks));
12.  }).Unwrap( );
13.  emails.ContinueWith(_ => Console.WriteLine("All emails sent"));
```

Within the pseudo code example, unwrap extension methods are used at lines 2 and 12. For example, the unwrap methods at line 2 ensures that GetFriendList returns a Task<FriendCollection> instead of a Task<Task<FriendCollection>. As such, at the foreach loop at line 6 'friends.Result' appropriately returns a FriendCollection (and not a Task<FriendCollection>).

Accordingly, Unwrap methods are used to reduce the level of task nesting and ensure that appropriate results are marshaled between tasks, for example, going from Task<Task<TResult>> to Task<TResult> or Task<Task> to Task. Unwrap methods can also be applied multiple times to reduce the level of multiple nested task. For example, for Task<Task<Task<Task>>> t, t.Unwrap( ).Unwrap( ).Unwrap( ) can be used to remove the multiple levels of nesting, reducing the result to a Task A proxy task is used to represent the aggregate asynchronous operation of a wrapping task and a wrapped task. The proxy task has a completion state that is at least indicative of the completion state of the aggregate asynchronous operation. The completion state of the aggregate asynchronous operation is determined and set from one or more of the completion state of the wrapping task and the wrapped task. The completion state of the proxy task can be conveyed to a calling logic to indicate the completion state of the aggregate asynchronous operation to the calling logic.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, a computer-implemented method for marshaling the state of one task to another task, the computer-implemented method comprising:
   an act of receiving a call to a wrapping task from calling logic, the wrapping task having a result that is represented by a wrapped task wrapped within the wrapping task;
   an act of receiving at an unwrap component an extension call to the wrapping task and creating a proxy task;
   an act of returning the proxy task from the unwrap component to the calling logic, the proxy task returned to the calling logic without requiring the calling logic to wait for completion of either the wrapping task or the wrapped task;

an act of determining at a completion state determination component of the unwrap component the completion state of the proxy task, the proxy task having a completion state that is determined by at least the completion state of the wrapped task when the completion state of the wrapping task indicates that the wrapping task ran to completion, and if the wrapped task is null then setting the state of the proxy to a canceled state otherwise the state of the proxy being determined from the completion state that is determined for the wrapped task;

an act of setting the completion state of the proxy task based on the completion state determined by the completion state determination component; and an act of conveying from the unwrap component the completion state of the proxy task to the calling logic.

2. The method as recited in claim 1, wherein the act of determining the completion state of the proxy task is based on the wrapping task and the wrapped task both being ran to completion.

3. The method as recited in claim 2, wherein the completion state of the proxy task represents an aggregate asynchronous operation ran to completion.

4. The method as recited in claim 2, further comprising an act of yielding result data from the wrapped task to the proxy task.

5. The method as recited in claim 4, wherein the act of conveying the completion state of the proxy task to the calling logic comprises an act of conveying the wrapped task's result data along with the completion status of the proxy task to the calling logic.

6. The method as recited in claim 1, wherein the act of determining the completion state of the proxy task is based on one of the wrapping task and the wrapped task being canceled by an external action that caused the one of the wrapping task and the wrapped task to cease operation.

7. The method as recited in claim 1, wherein determining the completion state of the proxy task comprises determining if (i) the wrapping task is either cancelled or faulted; or (ii) the wrapping task ran to completion such that the wrapped task is either cancelled, faulted or ran to completion.

8. The method as recited in claim 1, wherein the act of determining the completion state of the proxy task is based on an internal fault in one of the wrapping task and the wrapped task thereby causing the one of the wrapping task and the wrapped task to cease operation.

9. The method as recited in claim 8, further comprising an act of generating exception data corresponding to the internal fault of the one of the wrapping task and the wrapped task.

10. The method as recited in claim 9, wherein the act of returning the completion state of the proxy task to the calling logic comprises an act of returning the exception data along with the completion status of the proxy task to the calling logic.

11. The method as recited in claim 1, wherein if the wrapping task does not run to completion, then determining the completion status of the proxy task is based on the completion status of the wrapping task.

12. The method as recited in claim 1, wherein the act of receiving call to a wrapping task from calling logic comprises an act of receiving a call to a task of the format Task<Task>; and wherein the act of returning the completion state of the proxy task to the calling logic comprises an act of returning the completion state of a representative task of the format Task.

13. The method as recited in claim 1, wherein the act of receiving a call to a wrapping task from the calling logic comprises an act of receiving a call to a task of the format Task<Task<TResult>>; and wherein the act of returning the completion state of the proxy task to the calling logic comprises an act of returning the completion state of a representative task of the format Task<TResult>.

14. A computer program product for use at a computer system, the computer program product for implementing at one or more processors a method for marshaling the state of one task to another task, the computer program product comprising one or more computer storage media having stored thereon computer-executable instructions that, when executed at the one or more processors, cause the computer system to perform the method, including the following:

receive a call to a wrapping task from calling logic, the wrapping task having a result that is represented by a wrapped task wrapped within the wrapping task;

receive at an unwrap component an extension call to the wrapping task and creating a proxy task;

return the proxy task from the unwrap component to the calling logic, the proxy task returned to the calling logic without requiring the calling logic to wait for completion of either the wrapping task or the wrapped task;

determine at a completion state determination component of the unwrap component the completion state of the proxy task, the proxy task having a completion state that is determined by at least the completion state of the wrapped task when the completion state of the wrapping task indicates that the wrapping task ran to completion, and if the wrapped task is null then setting the state of the proxy to a canceled state otherwise the state of the proxy being determined from the completion state that is determined for the wrapped task;

set the completion state of the proxy task based on the completion state determined by the completion state determination component; and convey from the unwrap component the completion state of the proxy task to the calling logic.

15. The computer program product as recited in claim 14, wherein the completion state of the proxy task represents an aggregate asynchronous operation for both the wrapping task and the wrapped task.

16. The computer program product as recited in claim 15, wherein determining the completion state of the proxy task comprises determining if (i) the wrapping task is either cancelled or faulted; or (ii) the wrapping task ran to completion such that the wrapped task is either cancelled, faulted or ran to completion.

17. The computer program product as recited in claim 14, wherein the method further comprising yielding result data from the wrapped task to the proxy task, and wherein conveying the completion state of the proxy task to the calling logic comprises an act of conveying the wrapped task's result data along with the completion status of the proxy task to the calling logic.

18. The computer program product as recited in claim 14, wherein receiving a call to a wrapping task from the calling logic comprises receiving a call to a wrapping task having a format selected from among: Task<TResult> and Task<Task<TResult>>.

19. The computer program product as recited in claim 14, wherein if the wrapping task does not run to completion, then determining the completion status of the proxy task is based on the completion status of the wrapping task.

20. A computer system, the computer system including:
   system memory;
   one or more processors; and
   one or more computer storage media having stored thereon computer-executable instructions representing calling logic, a wrapping task, and an unwrap component, wherein the wrapping task further wraps a wrapped task, the calling logic being configured to:
   call the wrapping task;
   receive a handle to a proxy task from the unwrap component;
   receive a completion state of the proxy task, the completion state of the proxy task indicating the completion state of an aggregate asynchronous operation representing the wrapping task and the wrapped;
   the unwrap component further including a wrapping task state determination component, wrapped task state determination component, a completion state determination component, and a null checker, wherein the unwrap component is configured to:
   receiving the wrapping task;
   create the proxy task;
   return the handle to proxy task to the calling logic, the proxy task returned to the calling logic without requiring the calling logic to wait for completion of either the wrapping task or the wrapped task;
   determine the completion state of the aggregate asynchronous operation, including:
      the wrapping task state determination component determining the completion state of the wrapping task;
      the null checker determining if the wrapped task is not NULL; and
      the wrapped task state determination component determining the completion state of the wrapped task when the completion state of the wrapping task indicates that the wrapping task ran to completion and the wrapped task is not NULL;
   the completion state determination component setting the completion state of the proxy task to one of: a) the completion state of the wrapped task when the completion state of the wrapping task indicates that the wrapping task ran to completion or b) the completion state of the wrapping task when the completion state of the wrapping task indicates that the wrapping task did not run to completion; and
   the completion state determination component conveying the completion state of the proxy task to the calling logic to at least indicate the completion state of the aggregate asynchronous operation to the calling logic.

* * * * *